United States Patent [19]

Holstein et al.

[11] 3,757,669
[45] Sept. 11, 1973

[54] FRESH-BREW COFFEE VENDOR

[75] Inventors: Alvin W. Holstein, Brentwood; William H. Short; William V. Koeneker, both of St. Louis, all of Mo.

[73] Assignee: UMC Industries, Inc., New York, N.Y.

[22] Filed: Oct. 13, 1971

[21] Appl. No.: 188,718

[52] U.S. Cl. .................................... 99/280, 99/302
[51] Int. Cl. ............................................. A47j 31/34
[58] Field of Search..................... 99/289, 283, 299, 99/300, 302, 65, 280, 282

[56] References Cited
UNITED STATES PATENTS

| | | | |
|---|---|---|---|
| 2,898,843 | 8/1959 | Rockriver | 99/289 |
| 3,084,047 | 4/1963 | Holstein | 99/65 |
| 3,338,153 | 8/1967 | Holstein | 99/289 |
| 3,381,604 | 5/1968 | Bixby | 99/283 |

Primary Examiner—Robert W. Jenkins
Attorney—Irving Powers et al.

[57] ABSTRACT

A fresh-brew coffee vendor having a reservoir adapted to hold a plural-cup batch of brewed coffee and a single-cup brewer for supplying the reservoir, with a dispensing valve opened on a time cycle basis for dispensing a cup of coffee from the reservoir on a vend cycle, and a control for effecting operation of the brewer to brew as many cups of coffee as may be needed to reestablish the plural-cup batch in the reservoir whenever coffee is dispensed from the reservoir, and for maintaining the dispensing valve closed whenever the supply of coffee in the reservoir falls below a predetermined low level (e.g., one and one-half cups). Provision is also made for dumping coffee from the reservoir if a predetermined time interval (e.g., two hours) elapses without a vend, and operation of the brewer is then deferred until the next vend.

19 Claims, 7 Drawing Figures

FIG.1

Patented Sept. 11, 1973

Patented Sept. 11, 1973 3,757,669

FRESH-BREW COFFEE VENDOR

BACKGROUND OF THE INVENTION

This invention relates to coffee vendors, and more particularly to a fresh-brew coffee vendor.

The invention may be considered as an improvement upon the coffee vendors shown in the coassigned Holstein et al. U.S. Pat. No. 3,338,153 and Pryor et al. U.S. Pat. No. 3,446,137.

U.S. Pat. No. 3,338,153 relates to what is termed a batch-brew vendor, in which a cup of coffee is vended on each vend cycle from a reservoir containing a batch of brewed coffee, the supply of brewed coffee in the reservoir being automatically replenished when the last cup of brewed coffee is vended from the reservoir. Replenishment is via brewing of a fresh batch when the coffee in the reservoir is drawn down below a predetermined level, delivery of the fresh batch to a receiver, and transfer of the fresh batch to the reservoir from the receiver when the last cup is vended from the reservoir. Provision is made for dumping any coffee in the reservoir and receiver if a predetermined time interval elapses without a vend. As specifically mentioned in this patent, the reservoir holds three cups of coffee and the brewer brews a three-cup batch on each brew cycle.

U.S. Pat. No. 3,446,137 involves what is termed a single-cup brewer, wherein a single cup of coffee is brewed on each vend cycle and delivered to a cup.

The single-cup brewer shown in U.S. Pat. No. 3,446,137 has been quite acceptable commercially, but involves the problem common to all single-cup brewers of requiring a relatively considerable amount of time for each vend, which is disadvantageous during peak demand periods (e.g., during a "coffee break"). The batch brewer such as shown in U.S. Pat. No. 3,338,153 generally does not involve this problem (since it may relatively rapidly deliver a cup of coffee from the reservoir) but involves the problem that if the reservoir capacity (the volume of the brewed batch) is made relatively high rapidly to handle peak demand, the waste on dumping coffee from the reservoir is high, and if made relatively low to reduce the waste, the ability of the vendor rapidly to handle peak demand is reduced.

SUMMARY OF THE INVENTION

Among the several objects of this invention may be noted the provision of an improved coffee vendor adapted to serve more customers quickly by dispensing coffee from a batch in a reservoir while also reducing waste due to dumping of coffee from the reservoir; the provision of such a vendor having means for effecting dumping of coffee from the reservoir if a predetermined time interval elapses without a vend and for deferring brewing of coffee thereafter until a customer deposits coin and makes a selection; the provision of such a vendor adapted for variation in the amount of the batch of coffee held in the reservoir to adapt it for use in different locations; the provision of such a vendor which is adapted to be set for a low-volume batch for locations where peak demand is relatively low for maximum reduction of waste, and to be set for an intermediate-volume batch and a high-volume batch for locations where peak demand is intermediate and high; and the provision of such a vendor which is efficient and reliable in operation.

In general, a vendor of this invention comprises a reservoir having a capacity for holding a plural-cup batch (e.g., a two-cup, four-cup or six-cup batch) of brewed coffee, and a dispensing valve adapted to be opened for dispensing a cup of coffee from the reservoir on a vend cycle. The supply of brewed coffee in the reservoir is adapted to be replenished by a brewer operable through a brew cycle for brewing a quantity of coffee constituting a fraction of said plural-cup batch (e.g., a single-cup brewer). Operation of the brewer is under control of means responsive to the drawing down of the level of coffee in the reservoir below the level of the plural-cup batch on vending of coffee from the reservoir for initiating operation of the brewer and for maintaining it in operation for the number of brew cycles required to restore the level to the said plural-cup batch level. For example, if the batch is a six-cup batch, and one cup after another is vended during a peak period (e.g., during a coffee break), the brewer is recycled as many times as needed ultimately to restore the level of coffee in the reservoir to the six-cup batch level.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Referring to the drawings, a vendor of this invention for brewing and vending coffee is shown to comprise a reservoir R having a capacity for holding a plural-cup batch of brewed coffee, and a brewer B operable through a brew cycle for brewing a quantity of coffee constituting a fraction of this plural-cup batch. Means indicated at 2 connects the brewer to the reservoir for delivery of each brewed fraction to the reservoir. A dispensing valve 4 in communication with the reservoir is adapted to be opened on a time cycle basis for dispensing a cup of coffee from the brewer on a vend cycle of the vendor. Control means indicated generally at 6 is provided responsive to the drawing down of the level of coffee in the reservoir below the level of the said pluralcup batch on vending of coffee from the reservoir for initiating operation of the brewer B and for maintaining it in operation for the number of brew cycles required to restore the level to the said plural-cup batch level.

As shown in detail in FIGS. 2–6, the reservoir R comprises a tank 8 in a thermal insulation jacket 10. The tank is of rectangular shape in plan, and has a sloping bottom 12 inclined downwardly from one end of the tank to a well 14 at the other end. The tank has an inlet 16 for coffee from the brewer at one side, an overflow 18 alongside the inlet, and an outlet manifold 20 extending down from the well. The outlet manifold is constituted by an elongate tube of square cross-section closed at its lower end by a removable plug as indicated at 22 and having an upper lateral outlet 24 and a lower lateral outlet 26. The dispensing valve 4, which is a normally closed solenoid operated valve, is attached to the upper outlet 24. A normally closed solenoid valve 28 constituting what will be termed a dump valve is connected to the lower outlet 26.

Figures 2, 3, 4:
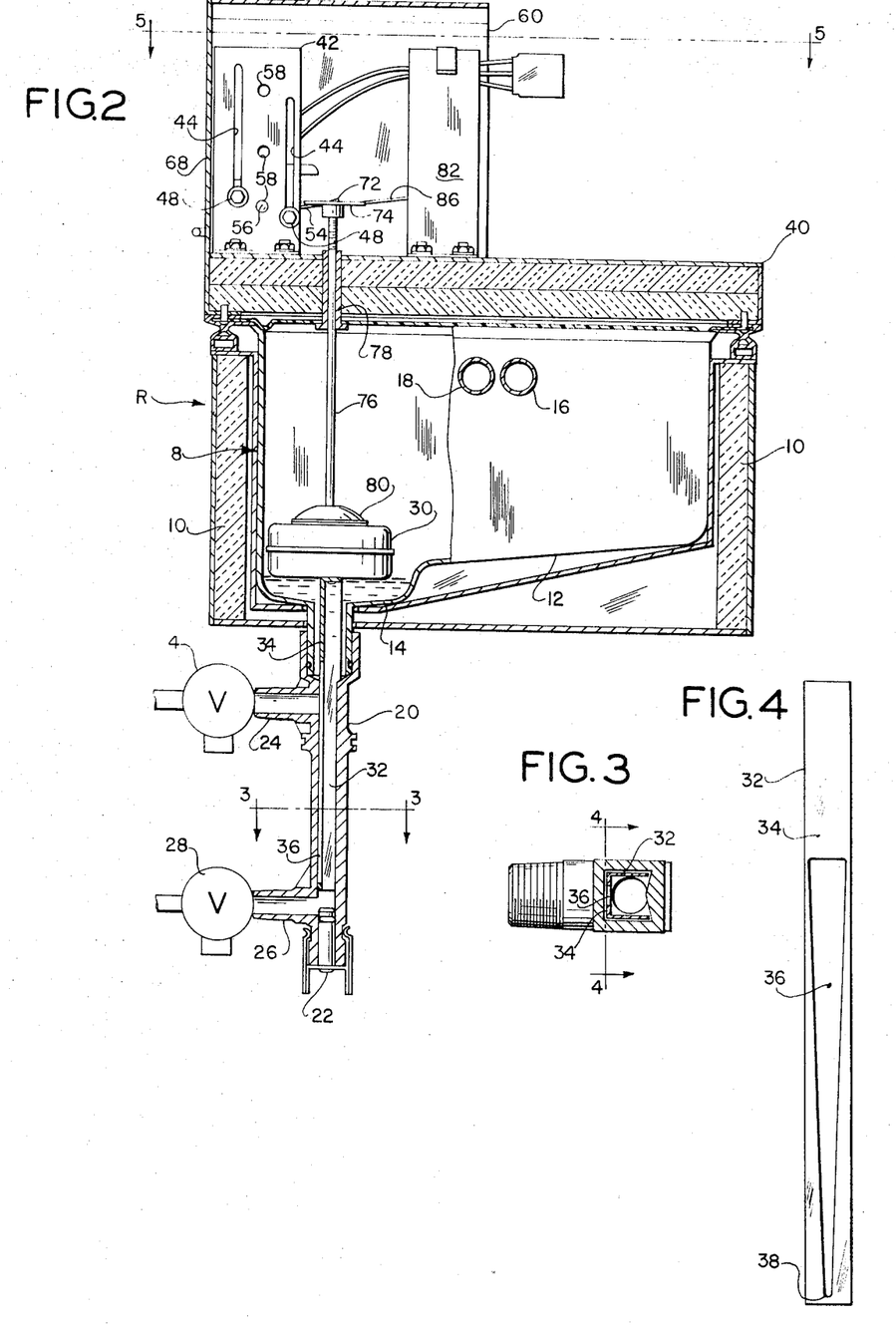
FIG. 2 is a vertical section of a reservoir of the vendor.
FIG. 3 is a horizontal section on line 3—3 of FIG. 2.
FIG. 4 is a view of a flow control, taken on line 4—4 of FIG. 3.
Figure 5:
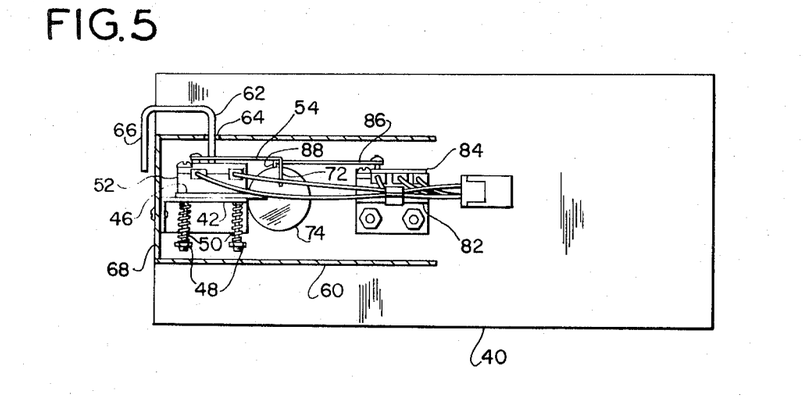
FIG. 5 is a horizontal section on line 5—5 of FIG. 2.

A float 30 is provided in the reservoir (in tank 8) to rise and fall with the rise and fall of brewed coffee in the reservoir. A flow control 32 extends down from the float through the manifold and is movable up and down in the manifold as the float rises and falls. This flow control is constituted by a channel section member disposed in the square cross-section manifold 20 with its web 34 toward that side of the manifold which has the outlets 24 and 26 therein. The flow control member 32 has a close sliding fit in the manifold, and is provided with an elongate triangular slot 36 in its web, the apex 38 of this slot being toward the lower end of the web, and the arrangement being such that, as the float rises, the effective size of the upper outlet 24 is reduced, and, as the float falls, the effective size of the upper outlet 24 is increased. The purpose of this is to maintain the flow of coffee out through the upper outlet 24 (and dispensing valve 4) relatively constant despite variation in the head (level) of coffee in the reservoir.

Figure 6:
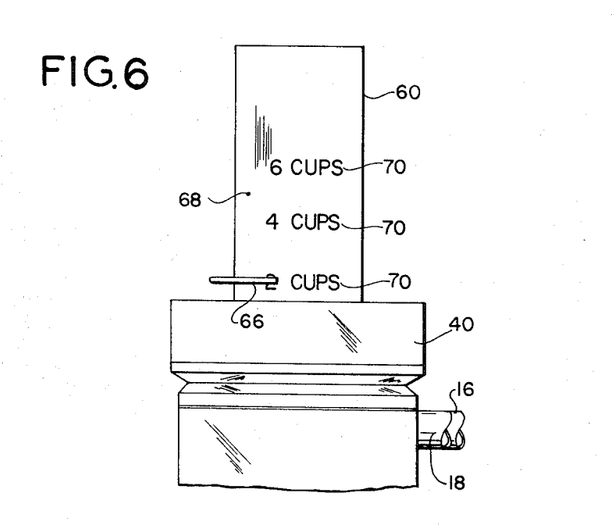
FIG. 6 is a left end view of the upper part of FIG. 2.

At 40 is indicated a thermally insulated lid for the reservoir R. Extending up from the lid at the end thereof above the well 14 is a switch mounting plate 42 having elongate vertical slots 44 therein. A switch carrier plate 46 is slidable up and down on one face of the mounting plate 42, having screws 48 extending therefrom through the slots 44 with coil compression springs 50 reacting from the plate 42 against the heads of the screws to bias plate 46 against the stated face of plate 42. Plate 46 carries a switch 52, referred to as the high level or batch level switch, having an operating arm 54. The plate 46 is vertically adjustable on the face of plate 42 to set switch 52 in any one of three different positions (at three different elevations) for determining three different size batches for the reservoir. As herein described, these are a two-cup batch, a four-cup batch, and a six-cup batch. The three positions are determined by engagement of a boss 56 on plate 46 in any one of three holes 58 arranged in a vertical series in plate 42. The assembly of plates 42 and 46 is enclosed in a housing 60 on top of the lid 40. Plate 46 has an arm 62 extending through a vertical slot 64 in one side of the housing for adjusting it up and down, this arm 62 having a finger 66 extending in front of end wall 68 of the housing acting as a pointer in conjunction with position markings as indicated at 70 on this end wall. The switch operating arm 54 has a lateral finger 72 at its free end extending above a head 74 constituted by a disk on the upper end of a rod 76 vertically slidable in a hold 78 in the lid 40 and having a weight 80 at its lower end bearing on the top of the float 30. Inherent spring bias in switch 52 biases arm 54 downward.

A second switch mounting plate 82 extends up from the lid 40 within housing 60 on the opposite side of the head 74 from the plate 42 and has a switch 84, referred to as the low level switch, mounted therein in fixed position. This low level switch 84 has an operating arm 86 having a lateral finger 88 at its free end which extends below the head or disk 74. The arrangement is such that when the level of brewed coffee in the reservoir falls below the predetermined level determined by the position of the low level switch 84, and the float 30 falls accordingly, the rod 76 slides down (the weight 80 at its lower end remains in engagement with the float 30) to the point where the head 74 at the upper end of the rod trips the operating arm 86 for the low level switch. In a physical embodiment of the vendor, this low level has been the 1½ cup level, but it may be selected to be otherwise. With the high level (or batch level) switch 52 set at the two-cup batch level (as shown in FIGS. 2 and 6), the switch is activated (by swing-down of its arm 54) whenever the level of coffee in the reservoir is drawn down from the two-cup level, and is deactivated (by swinging up of arm 54) when the level rises to the two-cup level. Arm 54 swings down on the fall of float 30 and swings up on the rise of the float. With the switch 52 set at the four-cup or six-cup batch levels, the switch is activated whenever the level is drawn down from the four-cup or six-cup level, and deactivated when the level rises to the four-cup or six-cup level.

Figure 1:
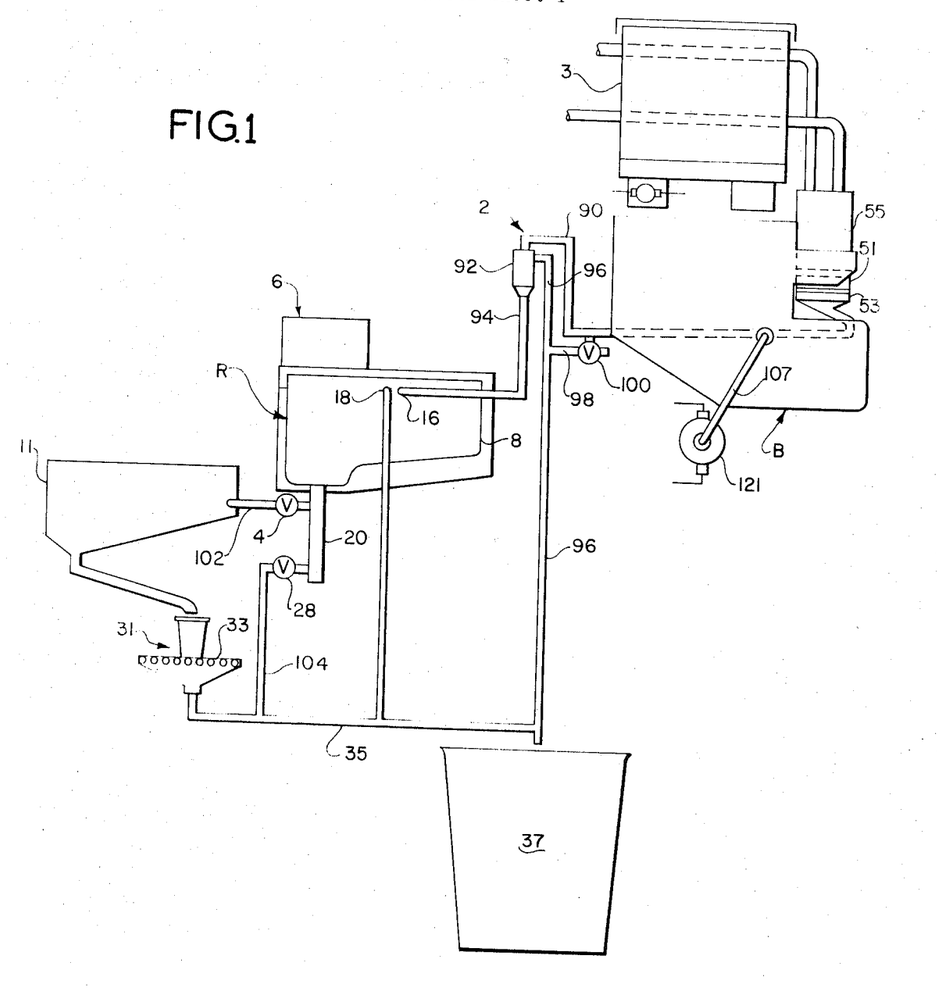
FIG. 1 is a diagrammatic view of a coffee vendor of this invention.

As above noted, the brewer B is the same as the brewer shown in U.S. Pat. No. 3,446,137 (designated 1 therein) and has a motor 121 (the same as in U.S. Pat. No. 3,446,137) for operating the brewer through a brew cycle. By reference to that patent, it will be observed that to operate the brewer through a brew cycle to brew one cup of coffee, motor 121 is energized to drive a cam shaft 107 through a single revolution cycle, the motor stopping after the cam shaft has rotated through approximately the first 16° of a revolution for a brew interval, and then resuming its operation to complete the rotation of the cam shaft back to the zero position. The vending operation is under control of a programmer which includes a cam shaft indicated at 193 in U.S. Pat. No. 3,446,137 driven by a timer motor 159, this cam shaft being driven through a single-revolution cycle in the course of an operating cycle of the vendor. In FIG. 1, there is illustrated the ground coffee dispenser 3, the mixing bowl 11, and grille 33 at cup station 31 drained as indicated at 35 to waste can 37, all as shown in U.S. Pat. No. 3,446,137. Also illustrated are the brew cup 51, the bottom head 53 for the cup and the brew vessel 55, the same as shown in said patent. Means 2, which connects the bottom head 53 to the inlet 16 of the reservoir R, comprises a line 90 extending from the head 53 to a pressure relief chamber 92 and a line 94 extending from chamber 92 to the inlet 16. An overflow line 96 drains chamber 92 to the waste can 37, and a drain line 98 including a solenoid-operated drain line valve 100 connects line 90 to line 96. The outlet of dispensing valve 4 is connected as indicated at 102 to the mixing bowl 11, and the outlet of dump valve 28 is connected as indicated at 104 to drain line 35.

Figure 7:
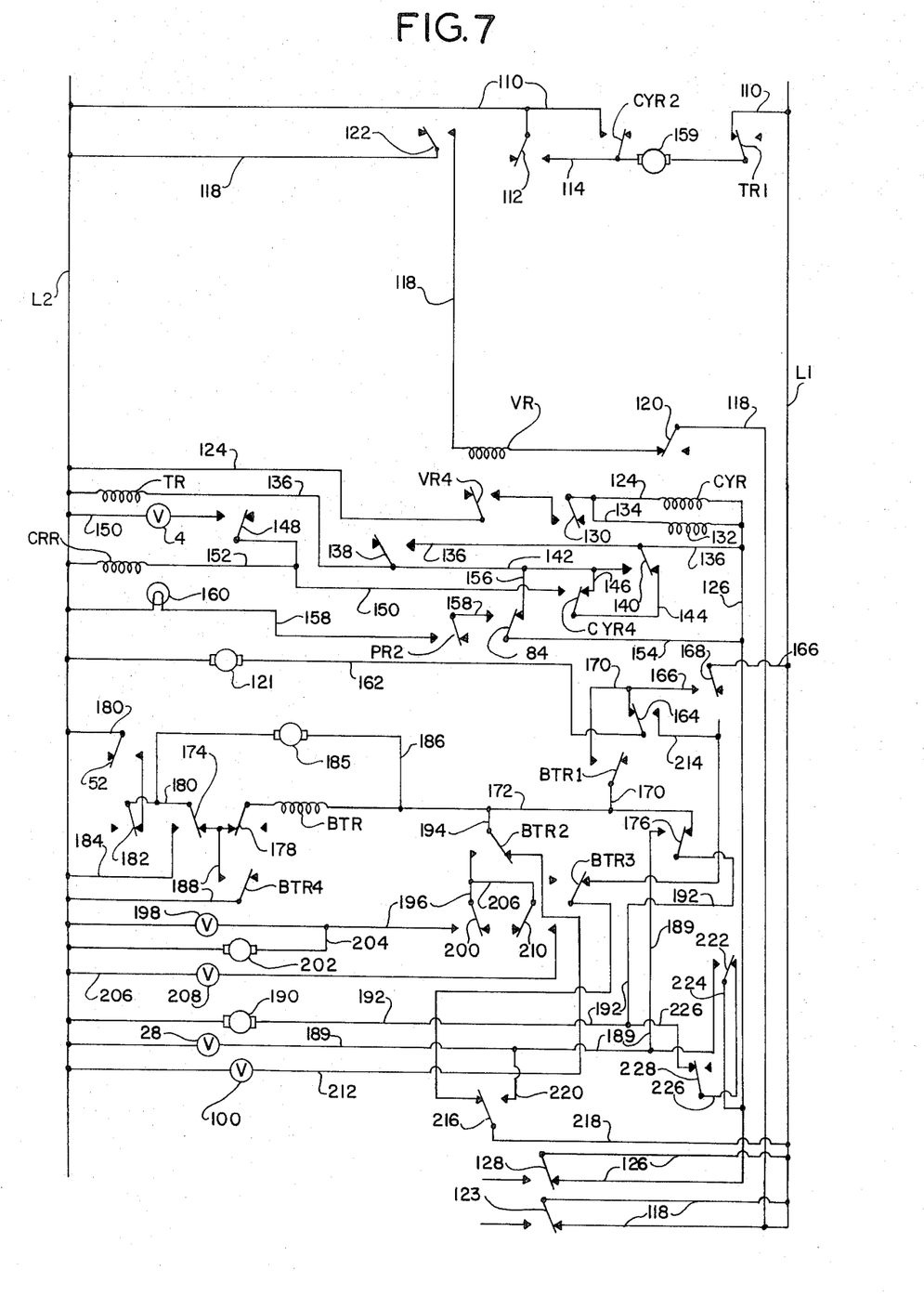
FIG. 7 is a wiring diagram.

Now referring to FIG. 7 showing the electrical circuitry of the vendor, main power lines are indicated at L1 and L2. As shown therein, the timer motor 159, which times out a vend (dispensing) cycle as in U.S. Pat. No. 3,446,137, is connected across lines L1 and L2 in a line 110 including a set of contacts TR1 of a timer relay TR and a set of normally open contacts CYR2 of a cycle relay CYR. Relay TR is energized as long as the low level switch 84 is satisfied (i.e., activated by there being at least one and one-half cups of coffee in the reservoir). A normally open vend timer cycle switch 112 is connected in parallel with contacts CYR2 as indicated at 114 to provide a holding circuit for the motor. The vend timer cycle switch 112 is actuated by a cam driven by motor 159 and corresponds to the cycle switch 163 shown in U.S. Pat. No. 3,446,137. At VR is indicated a vend relay (corresponding to relay VR of U.S. Pat. No. 3,446,137) which is connected between lines L1 and L2 in a line 118 including a vend timer reset switch 120 (corresponding to switch 161 of U.S. Pat. No. 3,446,137) and a coin switch 122. The vend timer reset switch 120 (like 161 of U.S. Pat. No. 3,446,137) is activated by a cam driven by motor 159 and opens toward the end of a dispensing or vend cycle. The coin switch 122 is closed in response to deposit in the vendor of sufficient coin for a vend.

The cycle relay CYR (which corresponds to the cycle relay CYR shown in 3,446,137) is connected in a line 124 between a line 126 (interconnected with line L1 via a normally closed switch 128) and line L2, this line 124 including a normally open vend switch 130 and normally open contacts VR4 of the vend relay VR. A solenoid referred to as the select solenoid 132 is connected in parallel with the cycle relay as indicated at 134. This select solenoid is provided for holding a selection made by a customer, as will be understood by those conversant with the art. The timer relay TR is connected in a line 136 between lines 126 and L2 including a normally open timer relay holding switch 138 operable by a cam driven by the vend timer motor 159, for the purpose of holding the timer relay energized for a full cycle of the motor 159.

A double-throw cutoff switch 140 has its movable contactor connected to line 136 between switch 138 and line 126. A line 142 connects its left contact to the movable contactor of switch 138. A line 144 connects its right contact to the movable contactor of a set of double-throw contacts CYR4 of the cycle relay CYR. The right contact of this set CYR4 is connected to line 142 as indicated at 146. The dispensing valve 4 is connected in series with a vend timer dispensing switch 148 in a line 150 between line L2 and the left contact of set CYR4. A coffee reset relay CRR is connected in parallel with valve 4 and switch 148 as indicated at 152. The low level switch 84 is a double-throw switch and as shown in FIG. 7 its movable contactor is interconnected by a line 154 with line 126. Its right contact is connected by a line 156 to line 142. Its left contact is connected by a line 158 to line L2 with line 158 including contacts CRR2 of reset relay CRR and a lamp 160.

The brewer motor 121 is connected in a line 162 between line L2 and the movable contactor of a double-throw switch 164 referred to as the brewer full cycle switch. The left contact of this switch 164 is connected via a line 166 including a normally open brew test switch 168 to line L1, and via a line 170 including normally open contacts BTR1 of a brew timer relay BTR to a line 172 including the latter. This line 172 interconnects the right contact of a double-throw brew timer full cycle switch 174 and the right contact of a double-throw delay timer dump switch 176, having a normally closed brew timer reset switch 178 therein between the switch 174 and the brew timer relay. A line 180 including the high level switch 52 and a normally closed brew safety switch 182 interconnects line L2 and the movable contactor of switch 174. A line 184 interconnects line L2 and the left contact of switch 174. A motor 185 referred to as the brew timer motor is connected in parallel around switches 174 and 178 and the brew timer relay BTR as indicated at 186. This motor 185 is provided to time out the operation of the brewer, separately from the motor 159. In U.S. Pat. No. 3,446,137, motor 159 times out the brewer operation, as well as the vend operation, but in the present case it has been found preferable to separate the vend and brew timing and use motor 185 separately from 159 to time out the brewing operation. In this regard, motor 185 drives cams which control the aforesaid brew timer reset switch 178, the brew timer full cycle switch 174, and also a brew water switch 210 and an air compressor switch 200. These switches 178, 174, 210 and 200 correspond in function to the switches 161, 163, 165 and 181, respectively, shown in U.S. Pat. No. 3,446,137. Normally open contacts BTR4 of relay BTR are connected in a line 188 between line L2 and a junction between switches 174 and 178.

The dump valve 28 is connected in a line 189 between line L2 and the left contact of the double-throw delay timer dump switch 176. The motor 190 of a delay timer adapted to time out intervals of up to a few hours is connected in a line 192 between line L2 and the movable contactor of switch 176. This delay timer motor 190, when energized, is adapted to time out a two-hour interval, for example, and at the end of that interval to throw the movable contactor of switch 176 onto the left contact. The movable contactor of switch 176 is set onto its right contact by the coffee reset relay CRR whenever the latter is energized.

A set of double-throw contacts BTR2 of the brew timer relay has its movable contactor connected as indicated at 194 to line 172. A line 196 having vent valve 198 (corresponding to valve 21 of U.S. Pat. No. 3,446,137) and air compressor switch 200 in series therein is connected between line L2 and the left contact of set BTR2. An air compressor 202 (corresponding to 23, 17 of U.S. Pat. No. 3,446,137) is connected in parallel with the vent valve 198 as indicated at 204. A line 206 having brew water valve 208 (9 in U.S. Pat. No. 3,446,137) and brew water switch 210 in series therein is connected between line L2 and the left contact of set BTR2. A line 212 including the drain line valve 100 is connected between line L2 and the right contact of set BTR2.

A line 214 including a normally closed set of contacts BTR3 of relay BTR interconnects the right contact of switch 164 and the left contact of a double-throw dump valve switch 216. The movable contactor of this switch is connected by a line 218 to line L1. The right contact of this switch is conncted by a line 220 to line 189.

At 222 is indicated a double-throw manual dump switch having its movable contactor connected by a line 224 to line 126. The movable contactor of this dump switch is normally set on its right contact, which is connected by a line 226 including a normally closed delay timer motor cutoff switch 228 to line 192 as shown at the lower right in FIG. 7. Operation is as follows:

When a customer deposits coin in appropriate amount in the vendor and makes a selection (e.g., as in U.S. Pat. No. 3,446,137) the coin switch 122 is closed (by the deposit of coin) and the vend switch 130 is closed (by the making of the selection). On closure of the coin switch, the vend relay VR is energized via line 118 (switch 120 being closed). With the vend relay energized, its contacts VR4 close and, with vend switch 130 closed, the cycle relay CYR is energized via line 124. The select solenoid 132 (in parallel with the cycle relay) is energized to hold the selection. On energization of the cycle relay, the movable contactor of its CYR4 set closes on the left, and thereby energizes the coffee reset relay CRR via lines 152, 150, 144 and 136. On energization of this relay CRR, the delay timer motor 190 is thereby reset to zero. It will be understood that on each end, this motor 190 is set in operation to time out a predetermined interval, herein specifically described as a two-hour interval (it may be more or less than this), and then proceeds to time out this two-hour delay interval unless another vend occurs before the end of two hours, resetting it to zero and starting another two-hour delay interval.

Also, with the movable contactor of the CYR4 set of contacts closed on the left, the dispensing valve 4 is energized and opened via the vend timer dispensing switch 148 being closed (by its associated cam driven by the vend timer motor 159). Switch 148 remains closed (under control of its cam) for a time interval (e.g., four to five seconds) such as to hold valve 4 open to allow for flow of one cup of ocffee from the reservoir R to the cup at the cup station 31. Switch 148 opens at the end of this interval to deenergize and close the valve to cut off the flow. As the coffee flows out of the reservoir, the level of coffee in the reservoir drops (meaning that the head of coffee in the reservoir decreases) and the float 30 falls. As the float falls, the flow control 32 descends and increases the effective outlet port area to compensate for the decreasing head, thereby to provide for delivery of a full cup to the customer. Toward the end of the dispensing interval, the vend timer reset switch 120 is opened by its respective cam of the vend programmer (driven by the vend timer motor 159). This deenergizes the vend relay VR to open the VR4 contacts, thereby deenergizing the cycle relay CYR and the select solenoid 132. In this regard, the vend timer reset switch 120 opens before the vend timer cycle switch 110 is opened by its cam (which is also driven by motor 159), and switch 110 keeps the motor 159 in operation to the end of the vend cycle.

For purposes of this description, it will be assumed that the high level (or batch level) switch 52 is set at the six-cup level, to provide for a six-cup batch in the reservoir. When the level drops down below this six-cup level, the switch 52 closes. This completes a circuit between lines L2 and 126 via line 180 including switch 52 (closed) and the brew safety switch 182 (closed at this time), line 186 including the brew timer motor 185, line 172, switch 176 (closed on its right contact), line 192, line 226 (including switch 228 which is closed at this time), switch 222 (closed on its right contact) and line 224. The brew timer relay BTR is also energized, switch 174 being closed on its right contact and switch 178 being closed at this time. Contacts BTR4 of relay BTR close and establish a holding circuit for the brew timer motor 185 via the brew timer full cycle switch 174, and for the brew timer relay BTR via the brew timer reset switch 178. This insures that the brew timer motor will operate through a full cycle even though the high level switch 52 may open before completion of the cycle.

Also on energization of the brew timer relay BTR, the movable contactor of its set of contacts BTR2 opens off the right contact (and closes on the left contact), thereby breaking the circuit 212 for the drain line valve, so that the latter closes for the brewing operation. Contacts BTR1 of the brew timer relay BTR close to energize the brew motor 121 via line 162, the brewer full cycle switch 164 (closed on its left contact), line 170 etc.

The brewer motor 121 operates to the point where the brewer is closed (see U.S. Pat. No. 3,446,137 for complete details), then its operation is cut off by the cammed opening of the brewer full cycle switch 164. Contacts BTR3 of the brew timer relay BTR are open at this time (this relay having previously been energized as above described). With the brew timer motor 185 in operation to time out a brew cycle, the brew water switch 210 is cammed closed to energize the brew water valve 208 (via the movable contactor of set BTR2 being closed on the left contact) to open this valve for flow of water to the brewer for brewing a cup of coffee therein. Following this, the air compressor switch 200 is closed to energize the air compressor 202 and the vent valve 198 to force the brewed cup of coffee out of the brewer and deliver it via line 90 to the reservoir R. This is the same as in U.S. Pat. No. 3,446,137, to which reference is made for details. Upon the resultant rise in the level of coffee in the reservoir back to the six-cup level, the float 30 rises and deactivates the high level switch 52 (opens it) via the rod 76 and head 74. The brew timer motor 185 continues in operation, via the above-mentioned holding circuit including contacts BTR4. The brew timer reset switch 178 is cammed open to deenergize the brew timer relay BTR. This results in opening of contacts BTR4 to break the holding circuit, closing of the movable contactor of the set of contacts BTR2 back on its right contact to re-energize the drain line valve 100, opening of contacts BTR1, and closing of contacts BTR3 to energize the brewer motor 121 via line 162 and the brewer full cycle switch 164 (closed on its right contact at this time) to complete the brew cycle (including, inter alia, the dumping of the coffee grounds as disclosed in U.S. Pat. No. 3,446,137). Ultimately, the switch 164 is cammed back on its left contact and this deenergizes the brewer motor. The movable contactor of brew timer full cycle switch 174 is back on its right contact at this time.

If two hours elapses after a vend without a succeeding vend, the delay timer motor 190 via the associated timer mechanism throws the movable contactor of the delay timer dump switch 176 over to its left contact; it also opens the delay timer motor cutoff switch 228, with a delay of two minutes, for example, between operation of switch 176 and switch 228. The dump valve 28 is thus energized for the two-minute interval via line 189, switch 176, line 192, and line 226 (including switch 228 closed for the two-minute interval) to open it for dumping coffee from the reservoir R. On opening of switch 226, the delay timer motor 190 is deenergized, as well as the dump valve 28. Switches 176 and 228 are reset upon the energization of the coffee reset relay CRR upon a vend, thereby to close the dump valve and start another two-hour count-down running from each vend.

If a number of cups of coffee are dispensed from reservoir R in rapid succession, the level of coffee in the reservoir is drawn down too fast for the single-cup brewer to restore the six-cup level after dispensing of each cup. Assuming, for example, that it takes five seconds to dispense a cup of coffee from the reservoir, and ten seconds to brew a cup in the brewer, if four cups are vended one after another in say thirty seconds, the brewer B will be set into operation immediately upon the first of the four vends, but will not complete the brewing of a cup until the second of the four vends is in progress. However, the arrangement is such that, with the high-level switch 52 remaining closed until the level of coffee in the reservoir R is restored to the six-cup level, the brewer will be operated through the four cycles needed to brew four cups for bringing the level in the reservoir back up to the six-cup level. This mode of operation prevails for any batch level setting (six-cup, four-cup or two-cup as herein disclosed, or such other batch quantities as may be desired).

Whenever the level of coffee in the reservoir R drops below the lower limit (e.g., the one and one-half cup level) at which the low level switch 84 is activated, the timer relay TR cannot be energized, and hence its contacts TR1 remain open so that the vend timer motor 159 cannot be energized to effect a vend cycle. Thus, vending (dispensing of coffee) cannot be effected until the low level switch is satisfied (i.e., until its movable contactor is closed by rise of the float 30 above the one and one-half level, for example, on its right contact. When the level of coffee is below the one and one-half level, and the movable contactor of the low level switch is on its left contact, if a customer makes a selection, thereby energizing the coffee reset relay CRR, the contacts CRR2 of the latter close to energize the lamp 160 to indicate to the customer that more coffee is being brewed and will be delivered shortly. The purpose of cutting off dispensing when the level goes below the one and one-half cup level, is to insure delivery of a full cup to the customer, noting that, after draining, some of the coffee from the next brewing collects in the outlet manifold 32 below the port 24 and is not delivered to the customer.

From the above, it will appear that the reservoir R is adapted to hold various plural-cup batch quantities (two-cup, four-cup or six-cup, as illustrated). Dispensing valve 4 is opened on a time cycle basis, as determined by the new programmer driven by the old timer motor 159, for dispensing one cup from the reservoir on a vend cycle in a relatively short time, e.g., four to five seconds. The brewer B, which brews one cup at a time (one-half, one-fourth or one-sixth of the total batch, as the case may be) is set into operation substantially immediately upon dispensing of a cup of coffee from the reservoir by activation of the high level switch 52 on drop in the level of coffee in the reservoir from the pre-set batch level (the two, four or six cup level, as the case may be), and effects operation of the brewer through one cycle or repetitively through a plurality of cycles, whatever is necessary to effect replenishment of the batch in the reservoir R (i.e., whatever is necessary to bring the level of coffee in the reservoir back up to the two, four or six cup level, as the case may be). Upon elapse of two hours without a vend, the batch of coffee standing in the reservoir is dumped, and the vendor lies dormant without any coffee in the reservoir until the next time a customer deposits coin and makes a selection. The effect of this is to set the brewer B in operation; it goes through a first cycle to deliver a first cup of coffee to the reservoir, then through a second cycle to deliver a second cup and so on until a full batch is stocked in the reservoir. Dispensing is deferred until, in the course of delivering the second cup to the brewer, the low level switch 84 is activated by the use of the level of coffee in the reservoir to the one and one-half cup level.

For locations where peak demand is high, the high-level switch 52 will be set at the six-cup batch level, for rapid vending of a maximum number of cups, accepting the waste of a six cup batch. For locations of relatively low peak demand, switch 52 is set at the two-cup batch level, which may not provide as well for rapid vending, but which minimizes waste. The four-cup batch setting of switch 52 is a compromise between the two.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vendor for brewing and vending coffee comprising:
   a reservoir having a capacity for holding a plural-cup batch of brewed coffee;
   a dispensing valve adapted to be opened for dispensing a cup of coffee from the reservoir on a vend cycle;
   a brewer operable through a brew cycle for brewing a quantity of coffee constituting a fraction of said plural-cup batch;
   control means responsive to the drawing down of the level of coffee in the reservoir below the level of said plural-cup batch on vending of coffee from the reservoir for initiating operation of the brewer and for maintaining it in operation for the number of brew cycles required to restore the level to said plural-cup batch level; and
   means for maintaining the dispensing valve closed when the level of coffee in the reservoir drops below a lower limit to defer dispensing of coffee until the level is raised at least to said lower limit.

2. A vendor as set forth in claim 1 wherein the brewer is a single-cup brewer.

3. A vendor for brewing and vending coffee comprising:
   a reservoir having a capacity for holding a plural-cup batch of brewed coffee;
   a dispensing valve adapted to be opened for dispensing a cup of coffee from the reservoir on a vend cycle;
   a brewer operable through a brew cycle for brewing a quantity of coffee constituting a fraction of said plural-cup batch; and
   control means responsive to the drawing down of the level of coffee in the reservoir below the level of said plural-cup batch on vending of coffee from the reservoir for initiating operation of the brewer and for maintaining it in operation for the number of brew cycles required to restore the level to said plural-cup batch level, said control means having means for setting said plural-cup batch level at one of a plurality of plural-cup batch levels.

4. A vendor as set forth in claim 3 wherein the brewer is a single-cup brewer and said setting means is adapted to set the level at a two-cup, four-cup or six-cup batch level.

5. A vendor as set forth in claim 3 wherein said control means comprises a switch activated in response to fall in level of coffee from the set batch level and deactivated in response to rise in level of coffee to the set batch level, and said setting means comprises means for changing the level of response of the switch.

6. A vendor for brewing and vend-ing coffee comprising:
  a reservoir having a capacity for holding a plural-cup batch of brewed coffee;
  a dispensing valve adapted to be opened for dispensing a cup of coffee from the reservoir on a vend cycle;
  a brewer operable through a brew cycle for brewing a quantity of coffee constituting a fraction of said plural-cup batch;
  control means responsive to the drawing down of the level of coffee in the reservoir below the level of said plural-cup batch on vending of coffee from the reservoir for initiating operation of the brewer and for maintaining it in operation for the number of brew cycles required to restore the level to said plural-cup batch level; and
  means responsive to lapse of a predetermined length of time after a vend cycle without a succeeding vend cycle for dumping coffee from the reservoir, and means for initiating operation of the brewer to supply the reservoir upon the first demand for a vend after the dumping.

7. A vendor as set forth in claim 6 having means for maintaining the dispensing valve closed when the level of coffee in the reservoir drops below a lower limit to defer dispensing of coffee until the level is raised at least to said lower limit.

8. A vendor for brewing and vending coffee comprising:
  a reservoir having a capacity for holding a plural-cup batch of brewed coffee;
  a dispensing valve adapted to be opened for dispensing a cup of coffee from the reservoir on a vend cycle;
  a brewer operable through a brew cycle for brewing a quantity of coffee constituting a fraction of said plural-cup batch; and
  control means responsive to the drawing down of the level of coffee in the reservoir below the level of said plural-cup batch on vending of coffee from the reservoir for initiating operation of the brewer and for maintaining it in operation for the number of brew cycles required to restore the level to said plural-cup batch level, said control means including a float, and having means actuated by the float for maintaining a relatively constant rate of flow from the reservoir on drop of the level of coffee in the reservoir.

9. A vendor as set forth in claim 8 wherein said reservoir has an outlet manifold extending down therefrom, and an upper outlet and a lower outlet from said manifold, and wherein said float-acutated means comprises a flow control extending down from the float movable up and down in the manifold and having an opening therein shaped to reduce the effective size of the upper outlet when the float rises and to increase the effective size of the upper outlet when the float falls.

10. A vendor for brewing and vending coffee comprising:
  a reservoir having a capacity for holding a plural-cup batch of brewed coffee;
  a dispensing valve adapted to be opened for dispensing a cup of coffee from the reservoir on a vend cycle;
  a brewer operable through a brew cycle for brewing a quantity of coffee constituting a fraction of said plural-cup batch; and
  control means responsive to the drawing down of the level of coffee in the reservoir below the level of said plural-cup batch on vending of coffee from the reservoir for initiating operation of the brewer and including means for maintaining it in operation for the continuous number of brew cycles required to restore the level in the event the first brew cycle thereof does not restore the level to said plural-cup batch level.

11. A vendor as set forth in claim 10 wherein the brewer is a single-cup brewer.

12. A vendor as set forth in claim 10 having means for maintaining the dispensing valve closed when the level of coffee in the reservoir drops below a lower limit to defer dispensing of coffee until the level is raised at least to said lower limit.

13. A vendor as set forth in claim 10 wherein said control means has means for setting said plural-cup batch level at one of a plurality of plural-cup batch levels.

14. A vendor as set forth in claim 13 wherein the brewer is a single-cup brewer and said setting means is adapted to set the level at a two-cup, four-cup or six-cup batch level.

15. A vendor as set forth in claim 13 wherein said control means comprises a switch activated in response to fall in level of coffee from the set batch level and deactivated in response to rise in level of coffee to the set batch level, and said setting means comprises means for changing the level of response of the switch.

16. A vendor as set forth in claim 10 having means responsive to lapse of a predetermined length of time after a vend cycle without a succeeding vend cycle for dumping coffee from the reservoir, and means for initiating operation of the brewer to supply the reservoir upon the first demand for a vend after the dumping.

17. A vendor as set forth in claim 16 having means for maintaining the dispensing valve closed when the level of coffee in the reservoir drops below a lower limit to defer dispensing of coffee until the level is raised at least to said lower limit.

18. A vendor as set forth in claim 10 wherein said control means includes a float, and having means actuated by the float for maintaining a relatively constant rate of flow from the reservoir on drop of the level of coffee in the reservoir.

19. A vendor as set forth in claim 18 wherein said reservoir has an outlet manifold extending down therefrom, and an upper outlet and a lower outlet from said manifold, and wherein said float-actuated means comprises a float control extending down from the float movable up and down in the manifold and having an opening therein shaped to reduce the effective size of the upper outlet when the float rises and to increase the effective size of the upper outlet when the float falls.

* * * * *